(No Model.)

J. C. PRATT.
BOTTLE

No. 548,457. Patented Oct. 22, 1895.

Fig. 5ª.

Attest
Walter N. Maddux
F. L. Middleton

Inventor
John C. Pratt
by Ellis Spear
Atty.

United States Patent Office.

JOHN C. PRATT, OF HARTFORD, CONNECTICUT, ASSIGNOR OF ONE-HALF TO UBERT K. PETTINGILL, OF BOSTON, MASSACHUSETTS.

BOTTLE.

SPECIFICATION forming part of Letters Patent No. 548,457, dated October 22, 1895.

Application filed April 23, 1895. Serial No. 546,821. (No model.)

*To all whom it may concern:*

Be it known that I, JOHN C. PRATT, a citizen of the United States, residing at Hartford, in the county of Hartford and State of Connecticut, have invented certain new and useful Improvements in Bottles and Jars, of which the following is a specification, reference being had therein to the accompanying drawings.

My invention relates to bottles and jars; and its object is to provide a bottle adapted to be varied as to its internal capacity so as to increase or diminish the amount of available space, as circumstances may require.

It has been found desirable to make some provision for elevating the liquid in a bottle to a position nearer to the opening thereof, as in the case of nursing-bottles, in which, when the milk has been lowered in the bottle, it is difficult and often impossible for the child to reach the contents remaining in the bottom of the bottle, and my invention is designed in one of its forms to overcome this objection and permit the adjustment of the bottom of the bottle so as to elevate the milk as the contents of the bottle diminishes. I have aimed, further, in another form to make the bottle extensible and adapt it for use either as a jar or as a bottle by the use of a removable spout or nozzle. As it is very essential that there be formed between the moving part and the receptacle liquid-tight connections, I have aimed by an improved form of gasket to supply this requirement.

Figure 1:
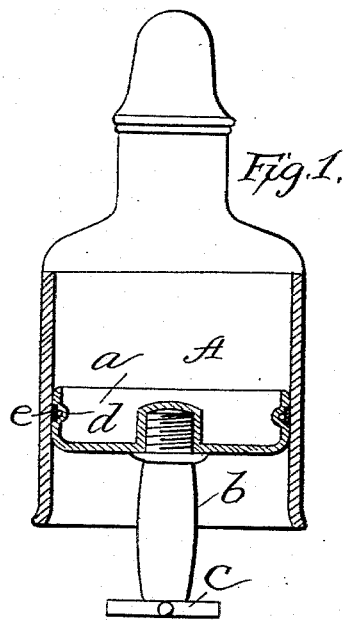
Figure 2:
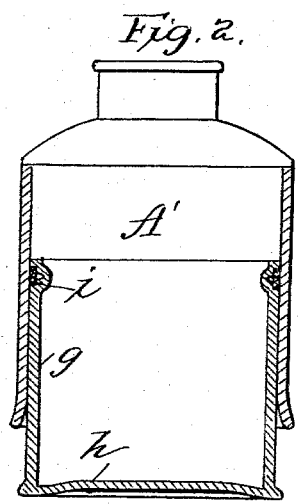
Figure 3:
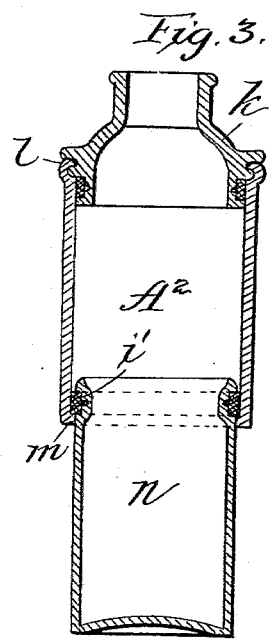
Figure 4:
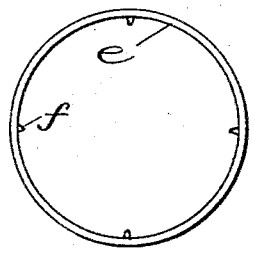
Figure 5:
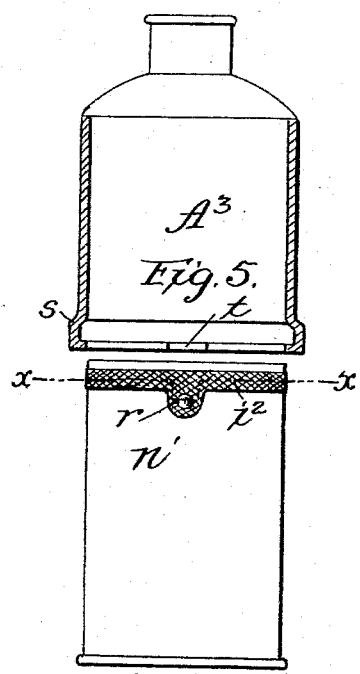
Figure 7:
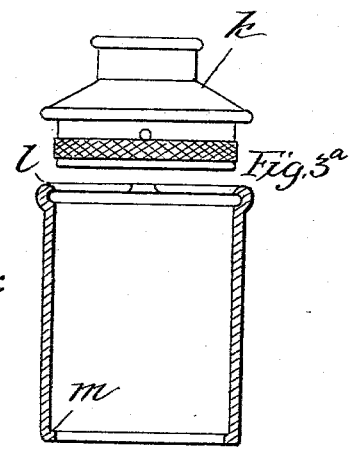
Figure 7:
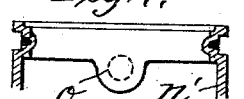
Figure 6:
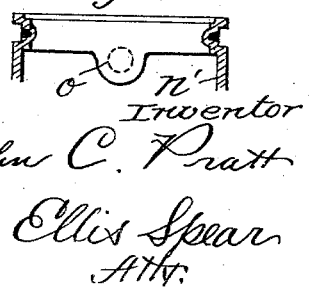

In the accompanying drawings, Figure 1 is a vertical section showing a nursing-bottle supplied with my improvement. Fig. 2 is a form of bottle having an extensible portion. Fig. 3 is a sectional view showing my combined bottle and jar, and Fig. $3^a$ details of Fig. 3. Fig. 4 shows in detail the arrangement of the gasket and its connection. Fig. 5 is a sectional view of a modification, and Figs. 6 and 7 details of Fig. 5.

In Fig. 1 a simple form of bottle is shown at A, having a neck with a rubber nipple thereon and an open bottom. Located in this bottle is a piston $a$, provided with a handle $b$, which is removably secured thereto by screwing into a socket, this handle being placed centrally and terminating at its end in crosspieces $c$, providing a convenient form of grip and being of sufficient width to form a rest when it is desired to stand the bottle upright. When desired, the handle may be removed and the bottle find a rest upon the lower edges of the body portion. I do not limit myself, however, to the particular form of handle shown, as this may be varied in many ways. The piston $a$ is preferably made of glass and has a flange extending parallel to the walls of the bottle, and in order to make liquid-tight connection between the piston and the walls of the receptacle I form a flange with a groove extending entirely around the flange, and at intervals small depressions are made, as shown at $d$, in the bottom of the groove. A rubber strip or gasket $e$ fits snugly within the groove and has projections $f$ formed on its face, which are adapted to enter the recesses or depressions in the bottom of the groove, and this construction holds the gasket firmly in place, and while it may be readily removed whenever desired for cleaning purposes there is no danger of its becoming displaced during the action of the parts. The piston, as the milk or other liquid lowers in the bottle, may be raised, thus elevating the milk toward the top of the bottle, so that it may be accessible to the infant using the bottle. Further, the piston is readily removable and permits perfect cleansing of the interior, permitting access to every part, which is very important in nursing-bottles and many other kinds of receptacles.

In Fig. 2 the bottle A' is preferably of flask-form, though it may be of any shape, and instead of the bottom being formed in the shape of a piston I form it extensible, having side walls, as shown at $g$, provided with a bottom $h$, the side walls fitting within the body of the receptacle proper and having a gasket connection at the point $i$, this being precisely the same as the gasket $e$ and arranged in the same manner. The extension may be pushed into the bottle proper to its full extent or drawn out and used, as may be desired. As a further modification of this arrangement, I have shown in Fig. 3 a body part $A^2$, having an open top and adapted to be used as a jar; but in order to permit this to be used as a bottle I provide a cap-piece $k$, having a central nozzle, and this is securely fastened by any convenient means, such as locking-flanges $l$, to the upper end of the body $A^2$. In this form of receptacle the body $A^2$ is provided with an open bottom, but with an inwardly-extending flange $m$, and fitted within the body is an extensible portion $n$, having a closed bottom and an open top, and of a diameter permitting it to be slipped in from the top of the part $A^2$. It passes entirely through the same and through the open bottom, but the flange $m$ prevents it from passing entirely through by reason of the fact that a gasket $i'$, similar to that heretofore described, is arranged around the upper end thereof in the same manner as mentioned, and thus the part $n$ is limited in its downward movement. It may be adjusted within the body $A^2$ according to its contents, the frictional contact keeping the parts in place, and this contact is added to by the weight of the upper part.

In Fig. 5 a further modification is shown, in which the extension $n'$ is provided with a grooved upper end and depressions or recesses on opposite sides just below the line of the groove, as shown at $o$. Within these recesses are located small springs $p$, and fitted to the groove is a gasket $i^2$, of the shape shown in Fig. 4, and applied in the same way, except that this gasket has enlargements on opposite sides covering the recesses $o$, and provided with nipples or projections $r$. The body $A^3$ has an open bottom with a flange around the edge extending inwardly, and the bottom is slightly enlarged at the lower end, as shown at $s$. The flange has recesses $t$ opposite each other, and in fitting the parts together the extensible portion $n'$ is passed through the bottom, with the nipples or projections $r$ registering with the recesses $o$, and after they have entered the part $n$ is given a turn, so that the projections $r$ are out of alignment with the recesses $t$ and enter the groove formed by the enlargement $s$. As the part $n'$ is moved within the body portion $A^3$, the projections $r$ are forced inwardly into the recesses $o$ against the pressure of the springs contained therein.

I claim—

A bottle or jar having a movable bottom, said bottom having a flange, a gasket encircling the flange and a centrally arranged removable handle in said bottom, substantially as described.

In testimony whereof I affix my signature in presence of two witnesses.

JOHN C. PRATT.

Witnesses:
HENRY E. COOPER,
WALTER DONALDSON.